(12) United States Patent
Smith et al.

(10) Patent No.: US 11,168,627 B2
(45) Date of Patent: Nov. 9, 2021

(54) CYLINDER IMBALANCE CORRECTION SYSTEM AND METHOD

(71) Applicant: GM GLOBAL TECHNOLOGY OPERATIONS LLC, Detroit, MI (US)

(72) Inventors: Michael A. Smith, Clarkston, MI (US);
Dale A. Frank, Grand Blanc, MI (US);
Ryan J. Prescott, Burton, MI (US);
Manoj K. Moningi, Troy, MI (US);
Michael J. Lucido, Northville, MI (US); Vijay Ramappan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/686,728

(22) Filed: Nov. 18, 2019

(65) Prior Publication Data

US 2021/0148293 A1 May 20, 2021

(51) Int. Cl.
*F02D 41/00* (2006.01)
*F02D 41/14* (2006.01)
(Continued)

(52) U.S. Cl.
CPC ......... *F02D 41/0085* (2013.01); *F02D 13/06* (2013.01); *F02D 17/02* (2013.01); *F02D 41/0087* (2013.01); *F02D 41/0097* (2013.01); *F02D 41/1454* (2013.01); *F02D 41/1495* (2013.01); *F02D 41/1498* (2013.01); *F02D 41/22* (2013.01); *F02D 41/221* (2013.01); *F02D 41/3005* (2013.01); *F02D 41/3076* (2013.01); *F02D 41/34* (2013.01); *F01L 13/0005* (2013.01); *F01L 2013/001* (2013.01); *F02D 41/2454* (2013.01); *F02D 41/2467* (2013.01);
(Continued)

(58) Field of Classification Search
CPC ...... F02D 13/06; F02D 17/02; F02D 41/0085; F02D 41/0087; F02D 41/22; F02D 41/221; F02D 41/224; F02D 41/227; F02D 41/228; F02D 41/1454; F02D 2041/0012; F01N 2430/02
See application file for complete search history.

(56) References Cited

U.S. PATENT DOCUMENTS 5,043,901 A * 8/1991 Miyazaki ............ F02D 41/2448
701/113
5,323,748 A * 6/1994 Foster ................... F02D 41/005
123/435
(Continued)

FOREIGN PATENT DOCUMENTS

DE 102005049069 A1 * 4/2007 ......... F02D 41/0087
DE 102006043679 A1 * 3/2008 ......... F02D 41/1458
(Continued)

*Primary Examiner* — John M Zaleskas
(74) *Attorney, Agent, or Firm* — Lorenz & Kopf LLP (57) ABSTRACT

Systems and methods are provided for determining and correcting air/fuel imbalance between cylinders of an internal combustion engine. A deactivation strategy is determined and implemented. An evaluation is made of whether the engine is operating with an air/fuel imbalance between cylinders. When an imbalance is identified, an alternate deactivation strategy is implemented. Based on outcomes of the alternate deactivation strategy, a source cylinder of the air/fuel imbalance is identified, and fuel flow to the source cylinder is corrected.

20 Claims, 4 Drawing Sheets

(51) Int. Cl.
  *F02D 41/22* (2006.01)
  *F02D 41/30* (2006.01)
  *F02D 17/02* (2006.01)
  *F02D 13/06* (2006.01)
  *F02D 41/34* (2006.01)
  *F01L 13/00* (2006.01)
  *F02D 41/24* (2006.01)

(52) U.S. Cl.
  CPC ........... *F02D 2200/0602* (2013.01); *F02D 2200/101* (2013.01)

(56) References Cited

U.S. PATENT DOCUMENTS

| | | | | |
|---|---|---|---|---|
| 5,687,692 A | * | 11/1997 | Togai | F02D 41/1498 123/436 |
| 5,694,901 A | * | 12/1997 | Togai | B60W 40/06 123/436 |
| 5,720,260 A | * | 2/1998 | Meyer | F02D 41/1498 123/436 |
| 5,721,375 A | * | 2/1998 | Bidner | F01L 13/0005 701/101 |
| 5,862,506 A | * | 1/1999 | Lynch | F02D 41/1498 701/101 |
| 6,758,179 B1 | * | 7/2004 | McKay | F01L 1/3442 123/90.17 |
| 7,027,910 B1 | | 4/2006 | Javaherian et al. | |
| 8,577,645 B2 | | 11/2013 | Turin et al. | |
| 9,488,121 B2 | | 11/2016 | Zhu et al. | |
| 9,874,167 B2 | | 1/2018 | MacEwen et al. | |
| 10,215,115 B1 | * | 2/2019 | Ranga | F02D 41/0085 |
| 2002/0046741 A1 | * | 4/2002 | Kakuho | F02D 13/0265 123/568.14 |
| 2003/0188714 A1 | * | 10/2003 | Yamamoto | F02D 19/0623 73/114.09 |
| 2006/0096581 A1 | * | 5/2006 | Pauli | F02B 27/0273 123/480 |
| 2006/0243040 A1 | * | 11/2006 | Reed | F02D 41/221 73/114.79 |
| 2007/0051092 A1 | * | 3/2007 | Pallett | F01N 11/007 60/276 |
| 2007/0051351 A1 | * | 3/2007 | Pallett | F02D 41/0082 123/692 |
| 2007/0101806 A1 | * | 5/2007 | Yamaguchi | B60K 6/445 73/114.04 |
| 2007/0125343 A1 | * | 6/2007 | Hayakawa | F02D 41/3845 123/447 |
| 2008/0312785 A1 | * | 12/2008 | Hartmann | F02D 17/02 701/29.1 |
| 2009/0276143 A1 | * | 11/2009 | Rackmil | F02D 41/0097 701/103 |
| 2009/0306846 A1 | * | 12/2009 | Jeong | F02D 17/02 701/31.4 |
| 2010/0082297 A1 | * | 4/2010 | Turin | F02D 41/0085 702/183 |
| 2010/0147058 A1 | * | 6/2010 | Cinpinski | F02D 41/221 73/114.51 |
| 2010/0175462 A1 | * | 7/2010 | Doering | G01M 15/09 73/114.31 |
| 2010/0175463 A1 | * | 7/2010 | Doering | F02D 41/221 73/114.37 |
| 2010/0242582 A1 | * | 9/2010 | Wang | F02D 41/221 73/114.62 |
| 2010/0288037 A1 | * | 11/2010 | Gibson | F01L 1/34 73/114.79 |
| 2011/0276250 A1 | * | 11/2011 | Sano | F02D 41/0087 701/103 |
| 2011/0288722 A1 | * | 11/2011 | Nicosia | F02D 41/2435 701/31.4 |
| 2012/0173122 A1 | * | 7/2012 | Nishikiori | F02D 41/0087 701/103 |
| 2012/0209494 A1 | * | 8/2012 | Verdejo | F01L 1/2405 701/102 |
| 2014/0163841 A1 | * | 6/2014 | Sane | F02D 41/22 701/104 |
| 2014/0261309 A1 | * | 9/2014 | Chen | F02D 17/02 123/320 |
| 2014/0360477 A1 | * | 12/2014 | Doering | F02D 41/0087 123/673 |
| 2015/0275784 A1 | * | 10/2015 | Whitney | F02D 41/0087 701/102 |
| 2015/0345417 A1 | * | 12/2015 | Zhu | F02D 41/144 73/114.32 |
| 2015/0354470 A1 | * | 12/2015 | Li | B60W 30/1882 701/54 |
| 2016/0252033 A1 | * | 9/2016 | Dye | F02D 41/401 123/481 |
| 2016/0258376 A1 | * | 9/2016 | Jammoussi | F02D 41/123 |
| 2017/0350332 A1 | * | 12/2017 | Martin | F02D 41/1495 |
| 2017/0356353 A1 | * | 12/2017 | Rollinger | F02D 17/02 |
| 2017/0356362 A1 | * | 12/2017 | Macewen | F02D 41/009 |
| 2017/0356363 A1 | * | 12/2017 | Jammoussi | F02D 41/222 |
| 2017/0356368 A1 | * | 12/2017 | Richards | F02D 41/0007 |
| 2017/0356370 A1 | * | 12/2017 | Doering | F02D 13/04 |
| 2017/0356374 A1 | * | 12/2017 | Rollinger | F02D 13/06 |
| 2017/0356380 A1 | * | 12/2017 | Surnilla | F02D 41/123 |
| 2018/0216562 A1 | * | 8/2018 | Dudar | F02D 41/1497 |
| 2018/0274471 A1 | * | 9/2018 | Dudar | F02D 41/0077 |
| 2019/0033170 A1 | * | 1/2019 | Dudar | F02D 41/221 |
| 2019/0186401 A1 | * | 6/2019 | Dudar | F02D 41/0087 |
| 2019/0218989 A1 | * | 7/2019 | Dudar | F02D 41/221 |
| 2019/0271278 A1 | * | 9/2019 | Surnilla | F02D 17/02 |
| 2019/0339164 A1 | * | 11/2019 | Kupiec | F02D 41/1497 |
| 2019/0390610 A1 | * | 12/2019 | Ulstad | F02D 41/3076 |
| 2020/0191075 A1 | * | 6/2020 | Szczepanski | F01N 11/007 |
| 2020/0200064 A1 | * | 6/2020 | Szczepanski | F01N 3/101 |

FOREIGN PATENT DOCUMENTS

| | | | | |
|---|---|---|---|---|
| DE | 102011088843 A1 | * | 6/2013 | ......... F02D 41/0087 |
| JP | 02055854 A | * | 1/1999 | ......... F02D 41/0087 |
| WO | WO-2019238246 A1 | * | 12/2019 | ......... F02D 41/0085 |

* cited by examiner

CYLINDER IMBALANCE CORRECTION SYSTEM AND METHOD

INTRODUCTION

The present disclosure generally relates to cylinder balance in an internal combustion engine and in particular, relates to learning individual cylinder air/fuel ratios using cylinder deactivation and correcting imbalances thereof.

A variety of systems process multiple working fluids to accomplish desired results. One application involves internal combustion engines such as those used in automobiles that process intake air and fuel within one or more combustion chambers. The air/fuel ratio delivered to the cylinders is closed-loop controlled, typically using inputs from a lambda sensor in the exhaust system to make corrections for efficient operation and air/fuel consumption. However, cylinder-to-cylinder and cycle-to-cycle variability may occur, such as due to trapped air ratio imbalances between cylinders that may arise.

In an engine with cylinder deactivation, a cylinder control module determines a target fraction of a total number of cylinders of the engine to be activated based on the torque/power requested at any given time. A controller sets the target fraction based on a predetermined fraction of the total number of cylinders and activates/deactivates intake and exhaust valves of the cylinders of the engine based on the target fraction.

The lambda sensor measures unburned oxygen in the exhaust providing an indication of a need to make air/fuel ratio adjustments to improve burn. However, the lambda sensor detects properties of a mixed exhaust gas stream that originates from multiple cylinders, regardless of how many may be deactivated at a given time. Imbalances may be difficult to diagnose because a single lambda sensor is located in a position to measure flow from all cylinders on a single exhaust path yielding a composite flow of exhaust gases from the multiple cylinders.

Accordingly, an average air/fuel ratio value is sensed, and individual cylinders may operate richer or leaner than the mean A/F ratio value, due to factors such as cylinder volumetric efficiency (VE) differences influenced by firing order and intake/exhaust manifold tuning effects and injector variability. As a result, air/fuel ratio adjustments are made based on an average of the individual cylinder conditions.

Accordingly, it is desirable to provide systems and methods that enable reducing cylinder-to-cylinder variation. Furthermore, other desirable features and characteristics of the present invention will become apparent from the subsequent detailed description and the appended claims, taken in conjunction with the accompanying drawings and the foregoing technical field and introduction.

SUMMARY

Systems and methods are provided for determining and correcting air/fuel imbalance between cylinders of an internal combustion engine. A cylinder imbalance correction system includes an engine having multiple cylinders, a crankshaft, an intake system and an exhaust system. One or more sensors are disposed in the exhaust system and is configured to generate a signal indicative of an air/fuel ratio in the cylinders. Another sensor is disposed adjacent the crankshaft and is configured to generate a signal indicative of crankshaft speed. A controller is configured to determine a deactivation strategy and to operate the engine with a first set of the cylinders deactivated. Using at least one of the sensor signals, an evaluation is made of whether the engine is operating with an air/fuel imbalance between the cylinders. An alternate deactivation strategy is determined and the engine is operated with a second set of the cylinders deactivated. The second set includes only some of the cylinders included in the first set. Based on outcomes of the alternate deactivation strategy, a determination is made of which cylinder(s) are a source cylinder of the air/fuel imbalance. Once identified, fuel flow to the source cylinder(s) is corrected.

In additional embodiments, the controller is configured to evaluate, using the sensor signals, whether the engine is operating with a coefficient of variation approximately indicative of a misfire.

In additional embodiments, the controller is configured to determine an alternative deactivation strategy, when the engine is operating with a coefficient of variation approximately indicative of a misfire.

In additional embodiments, an additional sensor is configured to generate a signal indicative of fuel pressure. The controller is configured to evaluate, using the fuel pressure signal, changes in fuel pressure when the engine is operated with a first set of the cylinders deactivated and when the engine is operated when the second set of the cylinders deactivated.

In additional embodiments, the controller is configured to determine, by the changes in fuel pressure, whether a fuel injector has a deteriorating performance.

In additional embodiments, two of the cylinders are configured to fire sequentially so that the controller is unable to discern, using the air/fuel ratio signal, which of the two cylinders is indicated. The controller is configured to determine, using the alternate deactivation strategy, an improved air/fuel ratio of the two cylinders.

In additional embodiments, the air/fuel ration signal is based on an oxygen level in the exhaust system. The controller is configured to adjust the air/fuel ratio of the engine's cylinders based on the oxygen level in the exhaust system and to adjust the air/fuel ratio of the source cylinder based on the outcomes of the alternate deactivation strategy.

In additional embodiments, the controller is configured to calculate volumetric efficiency to correct the fuel flow to the source cylinder.

In additional embodiments, the controller is configured to determine whether a coefficient of variation of the engine exceeds a first threshold and to determine whether an air/fuel imbalance exceeds a second threshold.

In additional embodiments, the controller is configured to determine an acceleration of the crankshaft and to determine, based on the acceleration, whether the threshold is exceeded.

In a number of other embodiments, a method of controlling an engine with cylinders, a crankshaft, an intake system and an exhaust system includes generating, by a sensor disposed in the exhaust system, a signal indicative of an air/fuel ratio in the cylinders. Another sensor is disposed adjacent the crankshaft and generates a signal indicative of crankshaft speed. A controller determines a base deactivation strategy and operates the engine with a set of the cylinders deactivated. Using the signals the controller determines whether the engine is operating with an air/fuel imbalance between the cylinders. The controller determines an alternate deactivation strategy and operates the engine with a different set of the cylinders deactivated. Based on outcomes of the alternate deactivation strategy, the controller determines which of the cylinders is a source cylinder of the air/fuel imbalance and corrects a fuel flow to the source cylinder.

In additional embodiments, the controller uses signals to determine whether the engine is operating with a coefficient of variation approximately indicative of a misfire.

In additional embodiments, when the engine is operating with a coefficient of variation approximately indicative of a misfire, the controller determines an alternate deactivation strategy.

In additional embodiments, using a fuel pressure signal the controller determines changes in fuel pressure when the engine is operated under both the base and the alternate deactivation strategy.

In additional embodiments, using the changes in fuel pressure, the controller determines whether a fuel injector has a deteriorating performance.

In additional embodiments, two cylinders of the cylinders are configured to fire sequentially so that the controller is unable to discern, from the air/fuel ratio signal, which of the two cylinders is indicated. The controller determines, using the alternate deactivation strategy, an improved air/fuel ratio of the two cylinders.

In additional embodiments, the air/fuel ratio signal is based on an oxygen level in the exhaust system. Based on the oxygen level in the exhaust system, the controller adjusts the air/fuel ratio of the cylinders, and adjusts, based on the outcomes of the alternate deactivation strategy, the air/fuel ratio of the source cylinder.

In additional embodiments, the controller calculates volumetric efficiency to correct the fuel flow to the source cylinder.

In additional embodiments, the controller determines whether a coefficient of variation of the engine exceeds its threshold based on acceleration of a crankshaft, and determines whether an air/fuel imbalance exceeds its threshold.

In a number of additional embodiments, a propulsion system includes an internal combustion engine having cylinders, a crankshaft, an intake system and an exhaust system. A sensor is disposed in the exhaust system, is responsive to changes in oxygen content, and generates a first signal indicative of an air/fuel ratio in the cylinders. Another sensor is disposed adjacent the crankshaft and generates a signal indicative of crankshaft speed. A controller determines a deactivation strategy and operates the engine with a set of the cylinders deactivated. Using the signals, the controller determines whether the engine is operating under the deactivation strategy with an air/fuel imbalance between the cylinders. The controller determines an alternate deactivation strategy and operates the engine with different cylinders deactivated. Using the signals, the controller determines whether the engine is operating under the alternate deactivation strategy with an air/fuel imbalance between the plural cylinders. Based on outcomes of the alternate deactivation strategy, the controller identifies which of the cylinders is a source cylinder of the air/fuel imbalance and corrects fuel flow to the source cylinder.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description discloses embodiments that are examples that are not intended to limit the application and its uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described herein, disclosed system and method embodiments learn air/fuel ratio imbalances between cylinders of an internal combustion engine and apply fuel command corrections for any identified cylinder in need of correction. For example, misfire conditions and/or air/fuel imbalance may be evaluated to determine if variances exist in air delivery to individual cylinders. Also for example, fuel rail pressure changes may be evaluated to determine if variances exist in fuel delivery to individual cylinders, such as by the injectors. When variances are discovered, cylinder deactivation with selective firing fraction changes may be employed to isolate a cylinder or cylinders where corrections are needed. In addition, improved cylinder balance may be achieved by using cylinder deactivation to more precisely determine the air/fuel ratio in adjacently firing cylinders that contribute to exhaust crosstalk.

Figure 1:
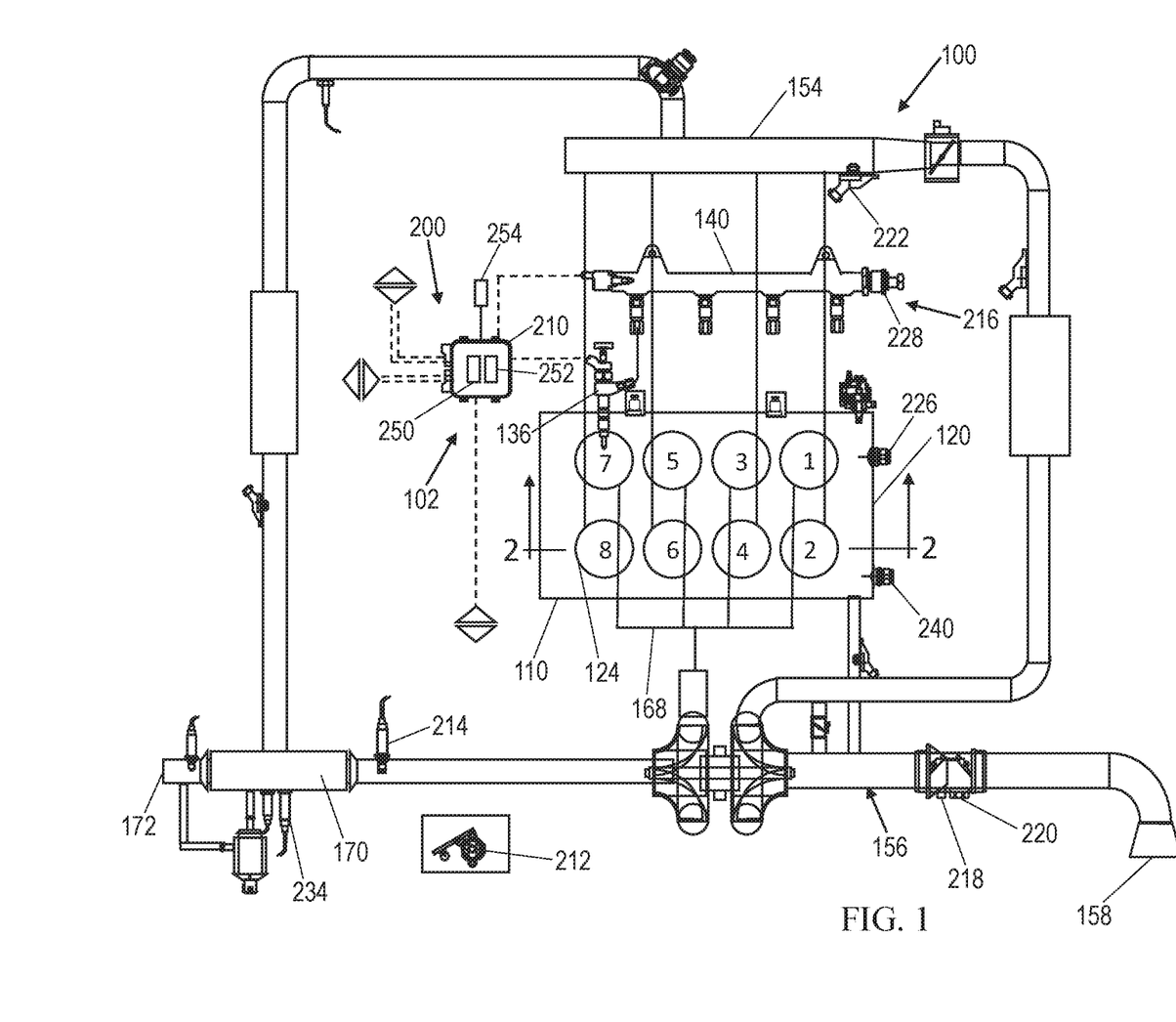
FIG. 1 illustrates a propulsion system with a cylinder imbalance system, in accordance with various embodiments.
Figure 2:
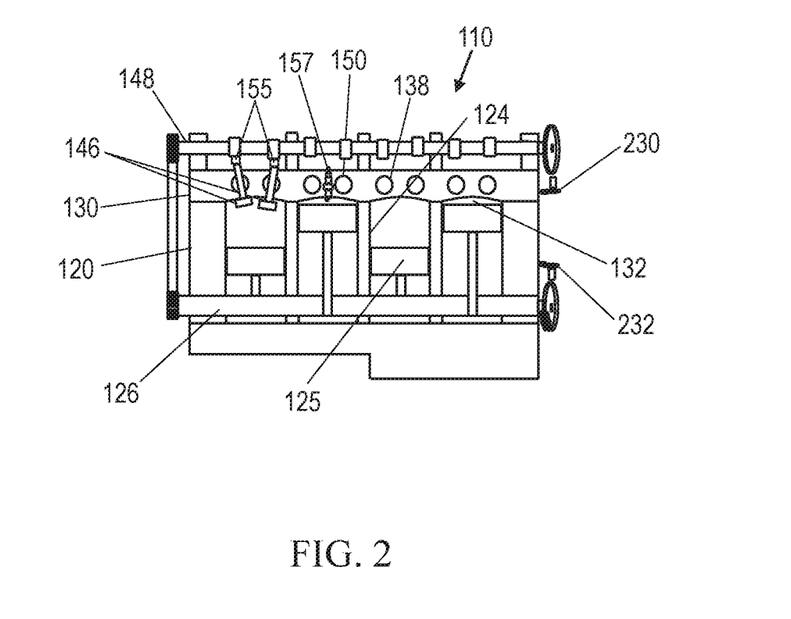
FIG. 2 is the section 2-2 of the internal combustion engine of the system of FIG. 1.

An embodiment may include a propulsion system 100 and a cylinder imbalance correction system 102, as schematically shown in FIG. 1, that includes an internal combustion engine 110, also schematically shown in FIG. 2. In this embodiment, the engine 110 generally has an engine block 120 defining eight cylinders 124, each having a piston 125 coupled to rotate a crankshaft 126. In the current embodiment, eight cylinders 124 are included numbered 1-8 for convenience. In other embodiments, a different number of cylinders 124 may be included. At least one cylinder head 130 cooperates with each piston 125 to define combustion chambers 132. A fuel and air mixture (not shown) is delivered into the combustion chambers 132 and ignited, resulting in hot expanding exhaust gasses causing reciprocal movement of the pistons 125. The fuel is provided by at least one fuel injector 136, one of which is shown with an understanding that each of the cylinders 124 may have a separate fuel injector 136. Combustion air is supplied through at least one intake port 138 in the cylinder head 130. The fuel is provided at high pressure to the fuel injector 136 from a fuel rail 140 in fluid communication with a high pressure fuel pump 142 that increase the pressure of the fuel received from a fuel source (not shown). Each cylinder 124 has sparkplug 157 as part of a spark ignition system. Each of the cylinders 124 has at least two valves 146, actuated by one or more camshaft(s) 148 rotating in time with the crankshaft 126. While an overhead camshaft 148 is shown, in other embodiments, a different arrangement may be employed, such as with pushrod operated overhead valves. The valves 146 selectively allow air into the combustion chambers 132 from the respective intake port 138 and alternately allow exhaust gases to exit through exhaust ports 150 in the cylinder head 130. Each valve 146 of each cylinder 152 may be selectively deactivated by actuators 155 to remove a cylinder or cylinders from doing work as further described below. In a number of embodiments, the actuators 155 disable the camshaft 148 from opening the valves 146.

The intake air may be distributed to the air intake ports 138 through an intake manifold 154. An air intake duct system 156 delivers air from the ambient environment through an intake 158 for supply to the intake manifold 154. The intake duct system 156 may include conventional components such as an air filter, charging system and throttle body. An exhaust manifold 168 directs exhaust gases from the exhaust ports 150 through an exhaust system to a tailpipe 172. The exhaust system may include an aftertreatment system 170.

The propulsion system 100 also includes a control system 200 that generally includes a controller 210, various actuators and a sensor system 216. The controller 210 may receive various signals from the sensor system 216 and send control signals to various actuators for operation of the propulsion system 100. The sensor system 216 includes one or more sensing devices that sense observable conditions of the propulsion system 100. In this embodiment, the sensing devices include, but are not limited to, an accelerator pedal position sensor 212 for generating a proportional pedal position signal, an exhaust/oxygen/wide range air-fuel (WRAF) sensor 214, an intake duct pressure sensor 218, a mass airflow and intake air temperature sensor 220, a manifold pressure and temperature (TMAP) sensor 222, coolant and oil temperature and level sensors 226, a fuel rail pressure sensor 228, a cam position sensor 230, a crank position sensor 232, exhaust pressure sensors 234, and a coolant temperature sensor 240. The controller 210 is communicatively coupled with the sensor system 216 to receive input signals from the various sensors, which are configured to generate the signals in proportion to various physical parameters associated with the propulsion system 100. Using the various sensed values, the controller 210 may conventionally determine a number of parameters such as angular speed and rate of acceleration of the crankshaft 126, and a composite air/fuel imbalance (AFI).

In general, the controller 210 may generate output signals for delivery to various controlled devices that are arranged to control the operation the propulsion system 100, including, but not limited to, the fuel injectors 136 that meter fuel into the cylinders 124. Note, dashed lines may be used to indicate communication between the controller 100 and the various sensors and devices, but are generally omitted for clarity. The controller 210 may comprise any number of electronic control modules and is configured to receive information from various sources including the sensor system 216, process that information, and provide control signals/commands based thereon to effect outcomes such as operation of the cylinder imbalance correction system 102, the propulsion system 100, and related systems. In the depicted embodiment, the controller 210 includes a processor 250 and a memory device 252, and is coupled with a storage device 254. The processor 250 performs the computation and control functions of the controller 210, and may comprise any type of processor or multiple processors, single integrated circuits such as a microprocessor, or any suitable number of integrated circuit devices and/or circuit boards working in cooperation to accomplish the functions of a processing unit. During operation, the processor 250 executes one or more programs and may use data, each of which may be contained within the storage device 254 and as such, the processor 250 controls the general operation of the controller 210 in executing the processes described herein, such as the processes described further below in connection with FIG. 4.

The memory device 252 may be any type of suitable memory. For example, the memory device 252 may include volatile and nonvolatile storage in read-only memory (ROM), random-access memory (RAM), and keep-alive memory (KAM), for example. KAM may comprise a persistent or non-volatile memory that may be used to store various operating variables while the processor 250 is powered down. The memory device 252 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 210. In certain embodiments, the memory device 252 may be located on and/or co-located on the same computer chip as the processor 250. In the depicted embodiment, the memory device 252 may store the above-referenced programs along with one or more stored values of the data such as for short-term data access.

The storage device 254 stores data, such as for long-term data access for use in automatically controlling the propulsion system 100 and its related systems. The storage device 254 may be any suitable type of storage apparatus, including direct access storage devices such as hard disk drives, flash systems, floppy disk drives and optical disk drives. In one exemplary embodiment, the storage device 254 comprises a source from which the memory device 252 receives the programs that execute one or more embodiments of one or more processes of the present disclosure, such as the steps of the process (and any sub-processes thereof) described further below in connection with FIG. 4. In another exemplary embodiment, the programs may be directly stored in and/or otherwise accessed by the memory device 252. The programs represent executable instructions, used by the electronic controller 210 in processing information and in controlling the propulsion system 100 and its subsystems, and the cylinder imbalance correction system 102 as further described below. The instructions may include one or more separate programs, each of which comprises an ordered listing of executable instructions for implementing logical functions. The instructions, when executed by the processor 250 support the receipt and processing of signals such as from the various sensors, and the performance of logic, calculations, methods and/or algorithms for automatically controlling the components and systems of the propulsion system 100. The processor 250 may generate control signals for the cylinder imbalance correction system 102, and to automatically control various components and systems of the propulsion system 100, based on the logic, calculations, methods, and/or algorithms. As will be appreciated, the data storage device 254 may be part of the controller 210, separate from the controller 210, part of one or more of the controllers, or part of multiple systems. The memory device 252 and the data storage device 254 work together with the processor 250 to access and use the programs and the data. While the components of the propulsion system 100 are depicted as being part of the same system, it will be appreciated that in certain embodiments, these features may comprise multiple systems. In addition, in various embodiments the propulsion system 100 may comprise all or part of, and/or may be coupled to, various other vehicle devices and systems.

The controller 210 controls operation of the propulsion system 100 to deliver the desired operational performance including torque, speed and emission management. In general, the controller 210 uses the available inputs, including those from the sensor system 216 and actuators identified herein, to provide the controller 210 with parameter data to effectively govern various functions. For example, based on data input, the controller 210 precisely calculates volumetric efficiency and controls delivery of the appropriate amount of fuel for a stochiometric air-fuel mixture in each cylinder 124. Instead of the controller 210, a different type of processor may be used to provide the electronic logic, e.g. an embedded controller, an onboard computer, or any processing module that might be deployed in the application.

The controller 210 determines when a misfire fault is detected. An engine cylinder 124 misfires when it is unable to efficiently burn the air/fuel mixture in the combustion chamber. Conditions that result in misfire/coefficient of variation (COV), may arise from a number of issues such as an improper air/fuel ratio, improper timing, improper compression or improper spark. The controller 210 monitors engine parameters and when misfire conditions are detected, a fault code indicative of the condition is generated. For purposes of the present disclosure, a threshold of those parameters is selected short of the level need to trigger a fault report, and COV conditions are monitored and compared to the threshold. To determine COV, the controller 210 may receive inputs to determine indicated mean effective pressure (IMEP) in the cylinders 124 including engine speed and acceleration from the crank position sensor 232.

The controller 210 also monitors parameters indicative of AFI and determines whether AFI exists based on whether one or more conditions are met. The controller may infer cylinder air-fuel imbalance based on output of the exhaust/ WRAF sensor 214. When a WRAF sensor 214 is employed, detection of the composite air/fuel mixture in the cylinders 124 is enabled. The signal from the WRAF sensor 214 reacts to changing oxygen levels in the exhaust and enables determining composite air/fuel ratio of the engine 110. Exhaust gases flow through the tailpipe 172 as a composite and discerning in which cylinder 124 exhaust gases originated may be difficult using the WRAF sensor 214 alone. For example, firing order and exhaust manifold geometry may result in the exhaust gas packet present at the WRAF sensor 214 having originated in plural cylinders 124 at a given time.

The controller 210 additionally commands an amount of fuel to be delivered to each cylinder 124 by its respective injector 136. The amount of fuel commanded correlates to the amount needed for stoichiometric conditions given the current operating state of the engine 110. The controller 210 also monitors pressure in the fuel rail 140 via the fuel rail pressure sensor 228. Each time an injector 136 meters an amount of fuel into a cylinder 124, a pressure drop occurs in the fuel rail 140 and the fuel rail pressure sensor 228 reports the composite pressure drop for the selected firing fraction. The pressure drop is a proxy for the amount of fuel actually delivered to the activated cylinders 124. The actual amount fuel delivered may coincide with the commanded amount or may deviate therefrom, such as due to deviation of injector performance.

The controller 210 further determines the firing fractions and executes a dynamic fuel management (DFM) strategy. DFM controls all 16 valves 146 so that any of the eight cylinders 124 may be selectively deactivated. The controller 210 uses engine load, among other parameters, to determine which firing fraction to employ. Engine load may be determined with various inputs such as from the intake air temperature sensor 220, manifold pressure and temperature sensor 222, accelerator pedal position sensor 238, and the coolant temperature sensor 240. Numerous deactivation configurations are employed ranging from as few as a two-cylinder mode of operation up through normal V8 operation. The sequencing of the various cylinder firing orders is controlled by the controller 210.

Examples of fractions of operation include ⅓, ⅖, ⅜, ⅔, ⅝ and ⅘. The fraction ⅘ for example, means four of a sequence of five cylinders are active, leaving only one cylinder in a sequence of five not firing. The denominators are selected because they divide evenly into the 720 degrees of rotation necessary for the four-cycle engine 110. For the ⅔ fraction as an example, the deactivated cylinders for the first 720 degrees of rotation would be 1, 2, and 4. In the next 720 degrees of rotation the deactivated cylinders are be 8, 6, and 3. In a number of embodiments, there are 64 available fractions of 8-cylinder operation. The controller 210 determines how many of the cylinders 124 are required at a given time in relation to the driver's request for torque via pedal inputs, and other factors. The firing cylinders 124 and their optimized order is then selected.

Figure 3:
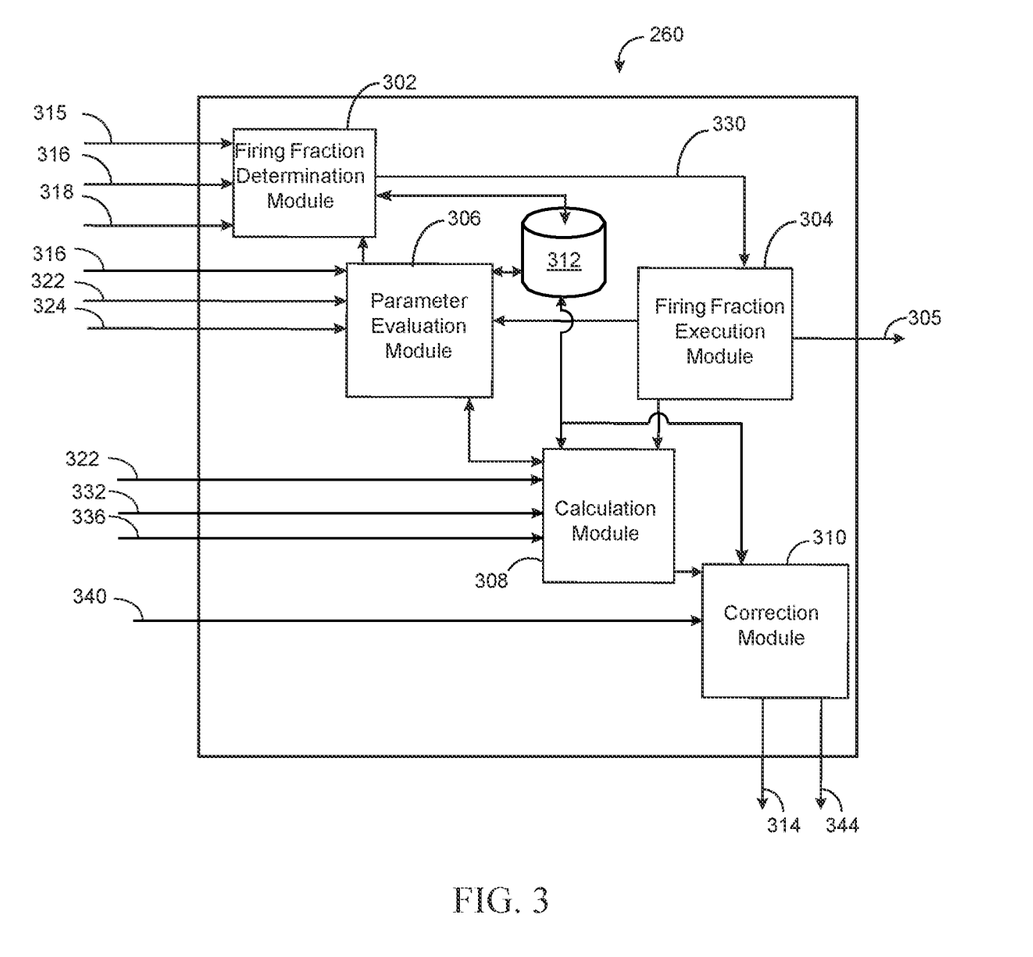
FIG. 3 is a dataflow diagram illustrating control aspects of the cylinder imbalance correction system, in accordance with various embodiments.

With reference to FIG. 3, the cylinder imbalance correction system 102 is generally carried out by operation of the controller 210 and may be configured to include a firing fraction determination module 302, a firing fraction execution module 304, a parameter evaluation module 306, a calculation module 308, a correction module 310, and a datastore 312. In general, the firing fraction determination module 302 determines what fraction of available cylinders 124 is employed, and in what firing order the engine 110 is operated. In this embodiment, the firing fraction execution module 304 executes base and alternative firing fractions via the signal 305 that initiates operation of valve actuators 155 and control of the spark ignition system with the sparkplugs 157. The base firing fraction is first selected and then alternative firing fractions are employed for air/fuel balance diagnostic purposes as further described below.

The parameter evaluation module 306 evaluates COV, AFI and ΔP during execution of the base and alternative firing fractions for evaluating air/fuel imbalances. The calculation module 308 determines the ratio of the mass density of the air-fuel mixture drawn into a cylinders 124 during an intake stroke. To correct imbalances, volumetric efficiency may be calculated using a new estimated air-per-cylinder using a percentage deviation of the COV, AFI. In addition, spark changes may be calculated. The calculation module 308 may use additional inputs, such as signal 332 from the manifold pressure and temperature sensor 222, signal 336 from the intake air temperature sensor 220, signal 322 from the WRAF sensor 214, inputs from other modules of the controller 210, and data such as volumes and constants from the datastore 312. The newly calculated volumetric efficiency of the cylinder(s) 124 is used by the correction module 310 to generate a signal 314 to adjust the fuel flow to the cylinder(s) 124, and the spark parameters to correct AFI via the signal 344, thereby correcting the imbalance between cylinders 124. The correction module 310 may receive a signal 340 from other modules of the controller 210 with data, including on the previous fuel flow rate to determine the correction factor. The calculation module 308 may also calculate pressure differences with inputs from the manifold pressure and temperature sensor 222 to evaluate air/fuel imbalances. The correction module 310 may determine a new fuel rate command for an imbalanced injector 136 based on a difference in ΔP resulting from the source cylinder 124 that is the source of the imbalance. The correction module 310 applies the necessary correction by adjusting the fuel flow rate to the identified cylinder via the signal 314 and or the timing of spark of the spark plugs 157 via the signal 344.

Figure 4:
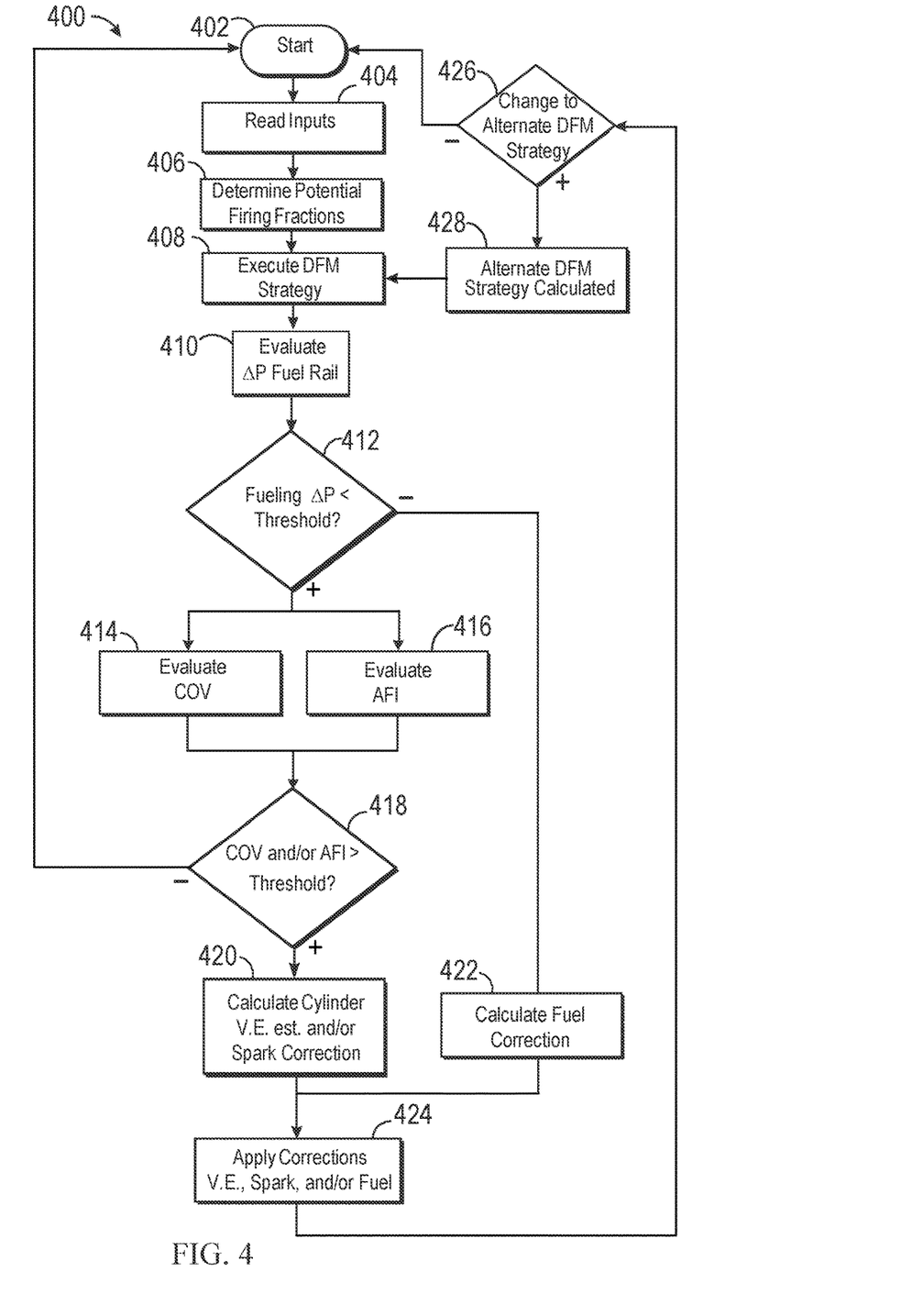
FIG. 4 is a flowchart of a process for implementing the cylinder imbalance correction system, in accordance with various embodiments.

Referring additionally to FIG. 4, along with continued reference to FIGS. 1-3, illustrated in flow chart form is a process 400 such as may be carried out by the cylinder imbalance correction system 102. The process 400 begins 402, such as when operation of the propulsion system 100 starts. The sensor inputs, including those of the sensor system 216 are read 404, along with inputs from other modules of the controller 210. In particular, a signal 315, such as from the accelerator pedal position sensor 212, provides input on the power requested of the engine 110 to the firing fraction determination module 302. In addition, a signal 316, such as from the crank position sensor 232, provides input on the speed of the engine 110 and particularly the angular speed of the crankshaft 132 to the firing fraction determination module 302. A signal 318, may also provide an engine load input from another module of the controller 210, which may be determined with inputs from the intake air temperature sensor 220, manifold pressure and temperature sensor 222, accelerator pedal position sensor 238, and the coolant temperature sensor 240. The signal 318 is delivered to the firing fraction determination module 302. The process 400 proceeds to determine firing fractions 406 for operation of the engine 110 at the present load with certain cylinders 124 deactivated when the load does not require operation of all eight cylinders 124. For example, based on the present load demand, the engine may supply the demand with four cylinders deactivated and only cylinder positions 1, 2, 7 and 8 firing. The process 400 then executes 408 the DFM strategy such as by operating the actuators 155 and the spark ignition system via the controller 210 and the firing fraction execution module 304, to disable operation of the deactivated valves 146 and sparkplugs 157.

With the engine 110 operating with one or more cylinders 124 deactivated, the controller 210 proceeds to evaluate 410 pressure change (ΔP) in the fuel rail 140 such as by the parameter evaluation module 306. The controller 110 monitors engine parameters, including a signal 324 from the fuel rail pressure sensor 228. The pressure drop resulting from the selected firing fraction is determined from the difference between the pressure at 8 cylinder operation and the pressure resulting from the selected firing fraction, and is recorded and may be stored in the datastore 312. The process 400 proceeds from the evaluate ΔP 414 step to determine 412, such as by the parameter evaluation module 306, whether the fueling ΔP is less than a threshold, or whether it is at or above the threshold. The pressure difference threshold is selected as an indication of when one fuel injector 136 is generating a pressure out of line with the other fuel injectors 136 and where that amount of pressure difference would cause a perceivable engine performance variation between cylinders 124. The predetermined threshold may be stored, such as in the datastore 312 and referenced by the parameter evaluation module 306. When the determination is positive, and the fueling ΔP is less than the threshold, with the engine 110 still operating with one or more cylinders 124 deactivated, the controller 210 proceeds to evaluate COV 414 such as by the parameter evaluation module 306. The controller 110 monitors engine parameters looking for indications of misfire conditions, which may be done using a conventional approach, such as using the signal 316 to determine crankshaft acceleration. Thresholds of those parameters are accessed by the parameter evaluation module 306, such as from the datastore 312. The thresholds are selected at values less than the level which would trigger a COV fault report. Having accessed the predetermined COV threshold and determined the state of the misfire related parameters, the parameter evaluation module 306 then determines 418 whether the COV threshold is reached.

Also, with the engine 110 operating with one or more cylinders 124 deactivated, the controller 210 proceeds to evaluate AFI 416 such as by the parameter evaluation module 306 accessing the WRAF sensor 214 inputs delivered through signal 322. The controller 110 monitors engine parameters, such as the signal from the WRAF sensor 214, looking for indications of air/fuel ratio imbalance conditions. A threshold of those parameters is accessed by the parameter evaluation module 306, such as from the datastore 312. The controller 210 may include an air fuel imbalance module (not shown) that receives and stores samples of the signal from the WRAF sensor 214. The AFI module diagnoses whether an AFI fault is present based on the samples. The threshold is selected at a magnitude less than the level which would trigger an AFI module fault report. Having accessed the predetermined AFI threshold and determined the state of the AFI related parameters, the parameter evaluation module 306 then determines 418 whether the AFI threshold is reached.

When the determination 418 is negative with regard to both the COV and the AFI not exceeding the thresholds, the process 400 returns to start 402 and proceeds therefrom. When one or both of the COV and/or the AFI parameters exceed respective threshold(s) meaning the determination 418 is positive, the process 400 proceeds to calculate 420 a cylinder volumetric efficiency estimate and/or a spark correction. For example, a determination 418 that the COV exceeds its threshold indicates the active cylinders 124 are a source of imbalance and a determination 418 that the AFI exceeds its threshold indicates that the active cylinders 124 are a source of imbalance. For the cylinder(s) 124 identified in evaluate COV 414 or evaluate AFI 416, a new volumetric efficiency is calculated 430, such as by the calculation module 308, when the COV exceeds its threshold. For the cylinder(s) identified in evaluate AFI 416, a spark correction is calculated 420, such as by the calculation module 308. The spark correction may adjust the timing of the spark generated by the spark plug(s) 157.

Returning to the determination 412 of whether the fueling ΔP is less than a threshold, when the determination 412 is negative and the ΔP is not less than its threshold, the process 400 proceeds to calculate 422 a fuel correction. The fuel correction may be a fuel rate change. For example, the calculation 422 may determine a modification to the control signal for the operation of the fuel injector(s) 136 to output a greater fuel rate.

The process 400 proceeds to apply correction(s) 424 as may be calculated at steps 420, 422. Any calculated volumetric efficiency correction 420 is corrected 424 by adjusting the fuel flow rate to the identified cylinder(s) via a flow rate signal 314, such as from the correction module 310, modifying operation of the involved fuel injector(s) 136. Any calculated spark correction 420 is corrected 424 by modifying operation of the involved spark plugs 157 by adjusting the spark of the identified cylinder(s) via a spark signal 344, such as from the correction module 310. Separately, any calculated 422 fuel correction is applied 424. The calculation module 308 may calculate 434 a new fuel rate command when an imbalanced injector 136 is discovered based on a difference in ΔP resulting from the imbalanced cylinder's 124 operation. The correction module 310 applies 424 the necessary correction 432 by adjusting the fuel flow rate to the identified cylinder via a flow rate signal 314. It should be understood that the corrections may be 1 when an imbalance cannot be associated with a particular cylinder 124 or cylinders 124, meaning no operational changes are effected by the signals 314, 344.

Following the application 424 of any corrections, the process 400 proceeds to determine 426 whether to implement an alternative DFM strategy. For example, when an imbalance between cylinders 124 persists, when the engine 110 is new, or periodically during the life of the engine, the determination 426 may be positive. In other situations, the determination 426 may be negative and the process may return to start 402. When the determination 426 is positive, the process 400 proceeds to selecting 428 an alternative DFM strategy.

Selecting an alternative DFM strategy 428, such as by the firing fraction determination module 302, includes selecting a fraction that uses the same number of deactivated cylinders 124 as the base fraction, but with a different set of activated cylinders 124 as was selected at the determine firing fraction 406 step. The alternate DFM strategy is selected 418 for the purpose of identifying the cylinder(s) 124 or fuel injector(s) 136 that is/are the source of the perceived or possible imbalance. For example, assuming cylinder positions 1, 2, 7 and 8 are selected as the base firing fraction at the determine firing fraction 406 step, selecting an alternative DFM strategy 428 may select a new set of four cylinders that includes only two of the cylinder positions 1, 2, 7, 8. The alternative DFM strategy is then executed 408, such as by the firing fraction execution module 304. For example, by changing two of the four operating cylinders to a different two cylinders, an evaluation may be made about which pair of cylinders contains the source cylinder(s) of the imbalance. The process 400 proceeds through steps 410-424. In a next iteration, one of the two cylinders that were dropped from those activated may be added back to the next firing fraction in place of one of the cylinders in the original alternative DFM strategy. In this way, through a few iterations the cylinder 124, or a group of cylinders 124, responsible for the imbalance may be identified. When the propulsion system 100 is shut down, the process 400 ends.

Through the foregoing embodiments, systems and methods learn air/fuel imbalances and make corrections. Imbalances may be corrected when they arise due to different physical cylinder volumes as may occur due to manufacturing variation. The resulting different volumes may lead to different air/fuel ratios where not all ratios are at preferred stoichiometric. Imbalances may also be corrected when they arise due to variations in fueling rates, such as may occur due to injector variations including those that arise due to performance deterioration over time. In addition, the disclosed systems and methods enable learning each cylinder's true air/fuel ratio when the WRAF sensor has difficulty discerning the imbalance source cylinder due to mixing of adjacent exhaust packets.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cylinder imbalance correction system comprising:
an engine having plural cylinders, a crankshaft, an intake system and an exhaust system;
a first sensor disposed in the exhaust system and configured to generate a first signal indicative of an air/fuel ratio in the plural cylinders;
a second sensor disposed adjacent the crankshaft and configured to generate a second signal indicative of crankshaft speed; and
a controller configured to:
determine a base deactivation strategy and operate the engine with a first set of the plural cylinders deactivated, the first set of the plural cylinders comprising a first number of cylinders;
determine, using at least one of the first and second signals and during the operation under the base deactivation strategy, whether the engine is operating with an air/fuel imbalance between the first set of the plural cylinders;
determine, only when the engine is operating with the air/fuel imbalance as determined when operating under the base deactivation strategy and prior to identifying which of the first set of the plural cylinders is a source cylinder of the air/fuel imbalance, an alternate deactivation strategy and operate the engine under the alternate deactivation strategy with a second set of the plural cylinders deactivated, wherein the second set of the plural cylinders comprises a second number of cylinders, wherein the second number of cylinders is equal to the first number of cylinders, wherein the second set includes only some of the plural cylinders included in the first set;

determine whether the air/fuel imbalance is present during the operation of the engine under the alternate deactivation strategy;

identify, based on outcomes of the base deactivation strategy and of the alternate deactivation strategy by comparing the determinations of the air/fuel imbalance under the base deactivation strategy and under the alternate deactivation strategy, which of the first set of the plural cylinders is the source cylinder of the air/fuel imbalance; and correct fuel flow to the source cylinder to correct the air/fuel imbalance when identified.

2. The cylinder imbalance correction system of claim 1, wherein the controller is configured to evaluate, using the first signal and the second signal, whether the engine is operating with a coefficient of variation indicative of a misfire.

3. The cylinder imbalance correction system of claim 2, wherein the controller is configured to determine the alternate deactivation strategy, only when the engine is operating with the coefficient of variation indicative of the misfire.

4. The cylinder imbalance correction system of claim 1, comprising a third sensor configured to generate a third signal that is indicative of a fuel pressure, wherein the controller is configured to evaluate, using the third signal, changes in the fuel pressure when the engine is operated with the first set of the plural cylinders deactivated and when the engine is operated when the second set of the plural cylinders deactivated.

5. The cylinder imbalance correction system of claim 4, comprising a fuel injector on the engine, wherein the controller is configured to determine, by the changes in the fuel pressure, whether the fuel injector has a deteriorating performance.

6. The cylinder imbalance correction system of claim 1, wherein two cylinders of the plural cylinders are configured to fire sequentially so that the controller is unable to discern, using the first signal solely, which of the two cylinders is the source cylinder of the air/fuel imbalance, and wherein the controller is configured to determine, using the alternate deactivation strategy, an improved air/fuel ratio of the two cylinders.

7. The cylinder imbalance correction system of claim 1, wherein the first sensor generates the first signal based on an oxygen level in the exhaust system and wherein the controller is configured to:

adjust the air/fuel ratio of the plural cylinders based on the oxygen level in the exhaust system; and adjust the air/fuel ratio of the source cylinder based on the outcomes of the alternate deactivation strategy.

8. The cylinder imbalance correction system of claim 1, wherein the controller is configured to calculate volumetric efficiency to correct the fuel flow to the source cylinder.

9. The cylinder imbalance correction system of claim 1, wherein the controller is configured to:

determine whether a coefficient of variation of the engine exceeds a first threshold; and determine whether the air/fuel imbalance exceeds a second threshold.

10. The cylinder imbalance correction system of claim 9, wherein the controller is configured to:

determine an acceleration of the crankshaft; and determine, based on the acceleration, whether the first threshold is exceeded.

11. A method of controlling an engine having plural cylinders, a crankshaft, an intake system and an exhaust system, the method comprising:

generating, by a first sensor disposed in the exhaust system, a first signal indicative of an air/fuel ratio in the plural cylinders;

generating, by a second sensor disposed adjacent the crankshaft, a second signal indicative of crankshaft speed;

determining, by a controller, a deactivation strategy;

operating, by the controller using the deactivation strategy, the engine with a first set of the plural cylinders deactivated, the first set of the plural cylinders comprising a first number of cylinders;

determining, by the controller using at least one of the first and second signals, that the engine is operating under the deactivation strategy with an air/fuel imbalance between the plural cylinders;

determining, by the controller only when the engine is operating using the deactivation strategy with the air/fuel imbalance and prior to identifying which of the first set of the plural cylinders is a source cylinder of the air/fuel imbalance, an alternate deactivation strategy;

operating, by the controller using the alternate deactivation strategy, the engine with a second set of the plural cylinders deactivated, wherein the second set of the plural cylinders comprises a second number of cylinders, wherein the second number of cylinders is equal to the first number of cylinders, wherein the second set includes only some of the plural cylinders included in the first set;

determining, by the controller, whether the air/fuel imbalance is present during the operating of the engine under the alternate deactivation strategy; identifying, by the controller and based on outcomes of the deactivation strategy and of the alternate deactivation strategy by comparing the determinations of the air/fuel imbalance under the deactivation strategy and under the alternate deactivation strategy, which of the first set of the plural cylinders is the source cylinder of the air/fuel imbalance; and correcting, by the controller, a fuel flow to the source cylinder.

12. The method of claim 11, comprising evaluating, by the controller using the first signal and the second signal, whether the engine is operating with a coefficient of variation exceeding a threshold that is indicative of a misfire, and setting the threshold at a value that does not trigger a coefficient of variation fault report.

13. The method of claim 12, comprising determining, by the controller and when the engine is operating with the coefficient of variation indicative of the misfire, the alternate deactivation strategy.

14. The method of claim 11, comprising evaluating, by the controller using a fuel pressure signal, changes in fuel pressure when the engine is operated with the first set of the plural cylinder deactivated and when the engine is operated when the second set of the plural cylinders deactivated.

15. The method of claim 14, comprising determining, by the controller using the changes in fuel pressure, whether a fuel injector has a deteriorating performance.

16. The method of claim 11, wherein two cylinders of the plural cylinders are configured to fire sequentially so that the controller is unable to discern, from the first signal solely, which of the two cylinders is the source cylinder of the air/fuel imbalance, and comprising determining, by the controller using the alternate deactivation strategy, an improved air/fuel ratio of the two cylinders.

17. The method of claim 11, wherein the first sensor generates the first signal based on an oxygen level in the exhaust system and comprising:
adjusting, by the controller based on the oxygen level in the exhaust system, the air/fuel ratio of the plural cylinders; and
adjusting, by the controller and based on the outcomes of the alternate deactivation strategy, the air/fuel ratio of the source cylinder.

18. The method of claim 11, comprising calculating, by the controller, volumetric efficiency to correct the fuel flow to the source cylinder.

19. The method of claim 11, comprising:
determining, by the controller and based on an acceleration of the crankshaft, whether a coefficient of variation of the engine exceeds a first threshold;
determining, by the controller, whether the air/fuel imbalance exceeds a second threshold.

20. A propulsion system, comprising:
an internal combustion engine having plural cylinders, a crankshaft, an intake system and an exhaust system;
a first sensor disposed in the exhaust system and responsive to changes in oxygen content, the first sensor configured to generate a first signal indicative of an air/fuel ratio in the plural cylinders;
a second sensor disposed adjacent the crankshaft and configured to generate a second signal indicative of crankshaft speed; and
a controller configured to:
determine a deactivation strategy and operate the internal combustion engine with a first set of the plural cylinders deactivated;
evaluate, using the first signal and the second signal, whether the internal combustion engine is operating under the deactivation strategy with an air/fuel imbalance existing between the plural cylinders;
determine, only when the internal combustion engine is operating using the deactivation strategy and the air/fuel imbalance is determined to exist under the deactivation strategy, an alternate deactivation strategy and operate the internal combustion engine with a second set of the plural cylinders deactivated, wherein the second set includes only some of the plural cylinders included in the first set;
evaluate, using the first signal and the second signal, whether the internal combustion engine is operating under the alternate deactivation strategy with the air/fuel imbalance existing between the plural cylinders;
calculate a coefficient of variation and an air/fuel imbalance during the deactivation strategy and during the alternate deactivation strategy;
determine whether the air/fuel imbalance is present during the operation of the engine under the alternative deactivation strategy;
identify, based on outcomes of the deactivation strategy and the alternate deactivation strategy including whether the air/fuel imbalance is present during the operation of the internal combustion engine under the deactivation strategy and under the alternate deactivation strategy, which of the first set of the plural cylinders is a source cylinder of the air/fuel imbalance;
calculate volumetric efficiency using at least one of the coefficient of variation and the air/fuel imbalance as calculated during the operation of the internal combustion engine under both the deactivation strategy and the alternate deactivation strategy; and
correct fuel flow to the source cylinder.

* * * * *